United States Patent Office 2,812,321
Patented Nov. 5, 1957

2,812,321

PROCESS FOR DIAZOTIZATION AND COUPLING

Dale R. Eberhart, Middlesex, and Neil M. Mackenzie, Bound Brook, N. J., assignors to American Cyanamid Company, New York, N. Y., a corporation of Maine No Drawing. Application November 15, 1955, Serial No. 547,034

11 Claims. (Cl. 260—141)

This invention relates to a process for diazotization, and more particularly, to an improved process for diazotization of 1-amino-2-naphthol-4-sulfonic acid. It further relates to an improved process for the diazotization of 1-amino-2-naphthol-4-sulfonic acid (hereinafter referred to as 1,2,4-acid) and the coupling of the resulting diazo compound.

1,2,4-acid is a very useful intermediate in the production of azo dyes and especially mordant azo dyes of red, gray, blue-black, and black shades of excellent fastness. For example, a useful dye known as Chrome Blue-Black R (C. I. 202) results from coupling of the 1,2,4-acid diazo with beta naphthol. A similarly useful dye, known as Neolan Blue CG (Pr. 144), is the chromium complex of the coupling of 1,2,4-acid diazo with 1-naphthol-8-sulfonic acid.

For the preparation of dyes of this type, 1,2,4-acid is diazotized and coupled. Due to the low activity of 1,2,4-acid diazo in coupling reactions, it is necessary that the coupling be carried out at as high a concentration as possible to speed up the reaction. In some cases, as with many coupling reactions for the formation of azo dyes, the 1,2,4-diazo is coupled directly in suspension with the coupling component without isolation of the diazo compound. To maintain the high concentration for coupling it is also necessary that the diazotization be carried out at high concentration. In some instances the 1,2,4-acid diazo is isolated, stored, and used later.

However, in preparing the 1,2,4-acid diazo in the presence of zinc chloride for direct coupling (without isolation) the high concentration necessary causes serious stirring and control difficulties. As the diazotization reaction proceeds and the temperature increases, the initially fluid slurry becomes progressively thicker. A point is reached where the mixture becomes semi-solid and any mixing practically ceases. In the actual procedure, ice is added when the temperature reaches 30° C. in an attempt to hold it at this temperature, but because the mixture is so thick there is inadequate stirring and ice piles up on the surface. This results in portions of the batch being cooled too much and in other portions not being cooled at all. Even after the coupling component solution is added, the mixture is stirred with difficulty. Because of the difficult temperature control, excessive amounts of time are required for the diazotization and temperature and reaction control are exceedingly difficult.

Even in the coupling reaction, the high concentrations often cause additional difficulties in stirring. The coupling mixture which results is of such a consistency that it cannot be poured, pumped, or easily handled. In certain instances, because of the extreme difficulties encountered, it has not been possible to run the coupling reaction directly with the original diazo slurry as formed. The diazo slurry sometimes becomes so thick that it becomes almost impossible mechanically to transfer it to the coupling kettle. To overcome this, the 1,2,4-acid diazo has been isolated first and then coupled. This method of coupling presents special disadvantages in that it requires extra labor and extra time. It furthermore, adds an extra step in the production of the dyestuff, since the diazotizations and couplings must be run as separate steps with an isolation in between.

The present invention is based on the discovery that by the addition of a surface active agent of the polyoxyethylene fatty ester class to the 1,2,4-acid diazotization reaction, the mixture remains fluid throughout the diazotization period.

It is an advantage of our invention, that the time needed to diazotize is decreased. It is a further advantage of our invention, that an exact control of the temperature of the reaction is possible. These advantages result from the greatly improved stirring which can be achieved permitting the use of ordinary equipment for this reaction. Greatly improved results are obtained in the manufacture of dyestuffs from the 1,2,4-acid, since not only are the advantages accruing from our invention carried over from the diazotization into the coupling reaction, but also similar difficulties in the later step are also corrected. Consequently, there are no stirring or thickening difficulties and temperature control is easily possible with no trouble. The time need for coupling is decreased, and the fluid mixture may be easily handled. In at least one case, the coupling mixture remains fluid even after heating to 50° C., where in the absence of surface active agent it becomes semi-solid. It is a further advantage of our invention that closer control of the diazotization reaction permits the close control of the nitrite usage.

Also, because of the great improvement, it is possible to use the 1,2,4-acid diazo without isolation even for coupling with a component such as 1-naphthol-8-sulfonic acid, for which it has heretofore usually been customary to isolate the diazo, because of coupling and other difficulties if done directly in ordinary equipment. Improved yields also result at this point.

Ordinarily, 1,2,4-acid is diazotized with an alkali metal nitrite in the presence of a heavy metal salt, such as zinc chloride or copper sulfate to stabilize the diazo and minimize oxidation of the 1,2,4-acid. The presence of the zinc chloride during the coupling has been found to improve the dye yield. As the heavy metal salt, zinc chloride or copper sulfate or a combination of the two are most suitable. Ten to twenty percent, based on the weight of the 1,2,4-acid used, of the surface active agent is usually added and the diazotization is carried out in the normal way. A minimum of 1% of the surface active agent on the weight of 1,2,4-acid is necessary to achieve the advantages of our invention, although the larger usage is preferred.

The reaction mixture of 1,2,4-acid diazo from the improved process using the surface active agent, may be used for coupling of 1,2,4-acid diazo with various coupling components, such as alpha naphthol, beta naphthol, resorcinol, 1-naphthol-8-sulfonic acid, phenyl methyl pyrazolone, acetoacetanilide, acetoacetanilide-3-sulfonic acid, benzoylacetonitrile, 2-ethoxybenzoylacetonitrile and the like.

It must be understood that the degree of improvement with all coupling components is not constant but it is of an especially high order and of special importance when coupling with alpha naphthol, with beta naphthol, and with 1-naphthol-8-sulfonic acid.

The surface active agent which is used in our invention must be of the polyethylene oxide-fatty acid ester type. The fatty acids which can be used include rosin acids and any of the common saturated and unsaturated aliphatic acids of carbon chains greater than 12 carbon atoms, such as lauric, myristic, palmitic, stearic, oleic, elaieic, linoleic, ricinoleic, erucic, brassidic and the like. Most of these occur naturally in various fats, usually as mixtures, and may be used in the preparation of the surface active agents, either as mixtures of acids without separation into individual components or as the pure acid. Especially useful for our invention, are the surface active agents derived from tall oil, which is a mixture of acids such as oleic, ricinoleic, linoleic, and the like, with rosin acids. Agents prepared from tall oil exhibit greater thermal and chemical stability and hence, are preferred. The surface active agent is prepared either by direct reaction with ethylene oxide or by esterification of the acids by polyethylene glycols. The properties of the surface active agent will vary with the number of oxyethylene units in the molecule. Agents prepared from the various acids and having polyethylene oxide chains of from 2–60 ethylene oxide units may be used in this invention to achieve the desired effect. Preferably, however, an average of about 16 polyethylene oxide units should be present to achieve the best advantages of our invention.

The invention is further illustrated by the following examples in which parts are by weight unless otherwise specified.

Example 1

A mixture of 24 parts of 1,2,4-acid in 72 parts of water is treated with dilute sodium hydroxide solution to neutralize any excess mineral acid present. To the mixture are added 2.4 parts of a polyoxyethylene ester of tall oil of about 16 oxyethylene units and a solution of 9 parts of zinc chloride in 9 parts of water. The slurry is then cooled to about 25° C. and ice is added to produce a temperature of about 13° C. To the slurry is added 18.5 parts of a 40% sodium nitrate solution and stirring is continued until the temperature rises to 30° C. The temperature is held at 30° C. by the addition of ice if necessary, and the mixture is stirred at this temperature until diazotization is complete (the temperature no longer rises spontaneously). The reaction mixtures remains thin and fluid throughout.

Example 2

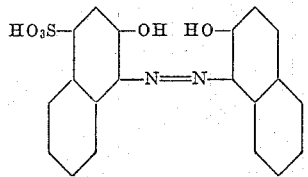

To a solution of 1,2,4-acid diazo compound prepared according to the procedure described in Example 1, is added 3.5 parts by volume of concentrated ammonium hydroxide solution. A solution of 15 parts of beta naphthol in 41.5 parts of a solution containing 4.14 parts of sodium hydroxide, warmed to 50° C., is then added immediately. 20.6 parts of soda ash are then added gradually and the temperature is adjusted to 36° C. The mixture is stirred at this temperature for a short period and is then heated to 50° C., and stirred unil the coupling reaction is substantially complete. The fluid coupling is then diluted, sodium chloride is added, and then the mixture is treated with concentrated hydrochloric to a very slight alkalinity. The mixture is then further diluted, and the solid material is removed by filtration and dried at 70° C.

Example 3

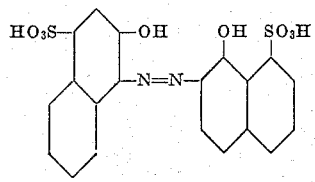

A slurry of 1,2,4-acid diazo is prepared according to the procedure described in Example 1, starting with 28.7 parts of 1,2,4-acid, and cooled to 16° C. One part of sodium hydroxide in the form of a concentrated aqueous solution is added to give a pH of approximately 6.75, then 10.56 parts of ammonium sulfate is added.

A slurry of 1-naphthol-8-sulfonic acid-sodium salt is prepared by neutralizing a mixture of 29.3 parts of 1-naphthol-8-sulfonic acid in 136 parts of water. The slurry of 1-naphthol-8-sulfonic acid sodium salt is then added to the diazo solution and the temperature of the mixture is adjusted to about 20° C. Sodium hydroxide solution (at a concentration of 33 parts in 100 parts by volume of solution) is then added rapidly until the pH of the mixture is 12.1 to 12.3. The temperature is adjusted to 22° C. and the whole mixture is then stirred until the coupling is substantially complete. The dye is isolated immediately by acidifying concentrated hydrochloric acid. The mixture is diluted and salted, and excess mineral acid is neutralized. After standing to complete precipitation, the dye is removed by filtration and dried at 70° C. Conversion of this dye to the chromium derivative produces Neolan Blue 2G (Pr. 144).

Example 4

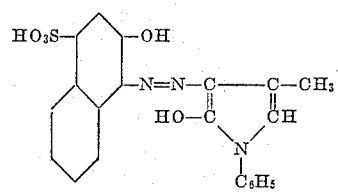

The process of Example 2 is followed substituting an equivalent amount of 1-phenyl-3-methyl-5-pyrazolone for the beta naphthol.

Example 5

The process of Example 3 is followed using alpha naphthol in place of the 1-naphthol-8-sulfonic acid.

Example 6

The process of Example 1 is followed using an ester of tall oil from a polyoxyethylene of two oxyethylene units, the results obtained are similar to those of Example 1.

Example 7

The process of Example 1 is followed using an ester of tall oil from a polyoxyethylene of thirty oxyethylene units in place of the surface active agent of Example 1, the results are similar to those of Example 1.

Example 8

The process of Example 1 is followed using a polyoxyethylene palmitate averaging about 15 oxyethylene units, instead of the surface active agent of Example 1, the results obtained being similar to those of Example 1.

Example 9

The process of Example 1 is followed using a polyoxyethylene stearate averaging 25 oxyethylene units in place of the surface active agent of Example 1, the results being similar to those of Example 1.

Example 10

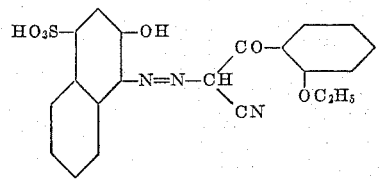

The process of Example 3 is followed substituting an equivalent amount of 2-ethoxybenzoylacetonitrile for the 1-naphthol-8-sulfonic acid.

We claim:

1. In the process for diazotizing 1-amino-2-naphthol-4-sulfonic acid with nitrous acid in the presence of a heavy metal salt, the improvement which comprises carrying out the reaction in the presence of at least 1% on the weight of the amino naphthol sulfonic acid of a nonionic surface active agent of the polyoxyethylene fatty acid ester class.

2. The process of claim 1 in which the usage of the surface active agent is between 10 and 20 parts per 100 parts of amino naphthol sulfonic acid.

3. The process of claim 2 in which the surface active agent is a tall oil ester of a polyoxyethylene of an average of 15 oxyethylene units.

4. A process for the preparation of azo dyes derived from 1-amino-2-naphthol-4-sulfonic acid and a coupling component which comprises diazotizing said 1-amino-2-naphthol-4-sulfonic acid with nitrous acid in the presence of at least 1% on the weight of said amino naphthol sulfonic acid of a nonionic surface active agent of the polyoxyethylene fatty acid ester class and coupling the resulting diazo compound without isolation of the said diazo coupling component.

5. The process of claim 4 in which the surface active agent is a tall oil ester of polyoxyethylene of an average of 15 polyoxyethylene units.

6. The process of claim 4 in which the usage of surface active agent is from about 10 to about 20 parts of the agent per 100 parts of the said amino naphthol sulfonic acid.

7. The proces of claim 6 in which the coupling component is beta naphthol.

8. The process of claim 6 in which the coupling component is 1-naphthol-8-sulfonic acid.

9. The process of claim 6 in which the coupling component is 1-phenyl-3-methyl-5-pyrazolone.

10. The process of claim 6 in which the coupling component is alpha naphthol.

11. The process of claim 6 in which the coupling component is 2-ethoxybenzoylacetonitrile.

References Cited in the file of this patent
UNITED STATES PATENTS

| | | |
|---|---|---|
| 2,038,942 | Kopp | Apr. 28, 1936 |
| 2,121,616 | Werntz | June 21, 1938 |
| 2,209,985 | Lubs | Aug. 6, 1940 |
| 2,612,494 | Von Glahn et al. | Sept. 30, 1952 |